United States Patent [19]

Reimann et al.

[11] Patent Number: 5,252,661

[45] Date of Patent: Oct. 12, 1993

[54] IMPACT MODIFYING RUBBER AND PARTLY AROMATIC COPOLYAMIDES

[75] Inventors: Horst Reimann, Worms; Gunter Pipper, Bad Durkheim; Hans-Peter Weiss, Mutterstadt; Christoph Plachetta, Limburgerhof; Eckhard M. Koch, Fussgoenheim; Gerd Blinne, Bobenheim; Walter Goetz, Kaiserslautern; Peter Steiert, Ludwigshafen, all of Fed. Rep. of Germany

[73] Assignee: BASF Aktiengesellschaft, Ludwigshafen, Fed. Rep. of Germany

[21] Appl. No.: 864,132

[22] Filed: Apr. 6, 1992

Related U.S. Application Data

[63] Continuation of Ser. No. 747,417, Aug. 19, 1991, which is a continuation of Ser. No. 362,303, Jun. 6, 1989, abandoned.

[51] Int. Cl.$^5$ .................... C08G 69/32; C08G 69/28; C08G 69/14; C08K 3/40
[52] U.S. Cl. ................... 524/514; 524/504; 524/607; 524/447; 524/398; 524/450; 524/494; 525/63; 525/66; 525/78; 525/178; 525/432
[58] Field of Search ............. 524/514, 607, 504; 525/63, 66, 78, 178, 432

[56] References Cited

U.S. PATENT DOCUMENTS

| | | | |
|---|---|---|---|
| 4,537,949 | 8/1985 | Schmidt et al. | 528/335 |
| 4,554,320 | 11/1985 | Reimann et al. | 525/184 |
| 4,603,166 | 7/1986 | Poppe et al. | 524/607 |
| 4,614,763 | 9/1986 | Trabert et al. | 525/66 |
| 4,670,508 | 6/1987 | Ohdaira et al. | 525/66 |
| 4,795,782 | 1/1989 | Lutz et al. | 525/66 |
| 4,847,330 | 7/1989 | Plachetta et al. | 525/183 |
| 4,851,473 | 7/1989 | Dunphy | 525/66 |

FOREIGN PATENT DOCUMENTS 1114541  5/1968  United Kingdom.

Primary Examiner—Thurman K. Page
Assistant Examiner—Edward Webman
Attorney, Agent, or Firm—Oblon, Spivak, McClelland, Maier & Neustadt

[57] ABSTRACT

Thermoplastic molding compositions contain as essential components

A) 40–95% by weight of a partly aromatic copolyamide composed essentially of
   $A_1$) 20–90% by weight of units derived from terephthalic acid and hexamethylenediamine,
   $A_2$) 0–50% by weight of units derived from $\epsilon$-caprolactam and
   $A_3$) 0–80% by weight of units derived from adipic acid and hexamethylenediamine,
B) 5–60% by weight of an impact modifying rubber, and in addition
C) 0–50% by weight of fibrous or particulate fillers or mixtures thereof.

14 Claims, No Drawings

IMPACT MODIFYING RUBBER AND PARTLY AROMATIC COPOLYAMIDES

This application is a continuation of application Ser. No. 07/747,417, filed on Aug. 19, 1991, which is a continuation of Ser. No. 07/362,303 filed on Jun. 06, 1989, now abandoned.

The present invention relates to thermoplastic molding compositions containing as essential components
A) 40–95% by weight of a partly aromatic copolyamide composed essentially of
  $A_1$) 20–90% by weight of units derived from terephthalic acid and hexamethylenediamine,
  $A_2$) 0–50% by weight of units derived from ε-caprolactam and
  $A_3$) 0–80% by weight of units derived from adipic acid and hexamethylenediamine,
B) 5–60% by weight of an impact modifying rubber, and in addition
C) 0–50% by weight of fibrous or particulate fillers or mixtures thereof.

The present invention further relates to the use of such thermoplastic molding compositions for producing fibers, films and moldings and to the moldings obtainable from the thermoplastic molding compositions as essential components.

Polyamides such as poly-ε-caprolactam and polyhexamethyleneadipamide are well established engineering plastics which are widely used in many fields. They are notable in general for great hardness, stiffness, heat distortion resistance, abrasion resistance and resistance to many chemicals. The impact modification of such polyamides is likewise known and described for example in DE-A-2,622,973 and U.S. Pat. No. 3,796,771, to mention just two.

However, for some purposes it would be desirable if it was possible to improve the heat distortion resistance of polyamides without impairing the remaining mechanical properties, in particular the impact strength.

There is prior art concerning copolyamides where some of the aliphatic units have been replaced by aromatic units, for example copolyamides of adipic acid, terephthalic acid, hexamethylenediamine and ε-caprolactam in any desired combination.

For instance, DE Patent 929,151 describes a process for preparing high molecular weight linear polyamides by condensing a mixture of an aromatic paradicarboxylic acid or an amide-forming derivative thereof, an equivalent amount of an aliphatic or cycloaliphatic diamine and another polyamide-forming starting material, such as a lactam, under polyamide-forming conditions.

GB Patent 1,114,541 describes ternary copolyamides which besides a main portion of polyhexamethyleneadipamide contain 20–40% by weight of units derived from terephthalic acid and hexamethylenediamine and 2–20% by weight of further polyamide component.

DE-A-1,669,455 describes a process for preparing drawn polyamide filaments by melt spinning a copolyamide containing not more than 40% by weight of units derived from terephthalic acid and hexamethylenediamine, where these polyamides are prepared in the presence of not less than 3 mol % of a monofunctional acid or basic stabilizer.

DE-A-1,620,997 describes linear fiber-forming terpolyamides containing units derived from adipic acid and hexamethylenediamine, terephthalic acid and hexamethylenediamine, and isophthalic acid and hexamethylenediamine.

DE-A-3,407,492 describes a process for preparing copolyamides of adipic acid, terephthalic acid and hexamethylendiamine which contain 25–48% by weight of units of hexamethyleneterephthalamide by heating a 40–70% strength aqueous solution of the monomers to not less than 250° C. in not less than 15 minutes and condensing to a relative viscosity of 1.5–2.4. The water is then distilled off in one or more stages, and the resulting precondensate is postcondensed in a conventional manner.

None of the abovementioned references contain any details or indications as to how the partly aromatic copolyamides described behave on impact modification with rubbers.

It is an object of the present invention to provide impact modified thermoplastic molding compositions based on partly aromatic copolyamides that shall be notable for good mechanical properties, in particular impact strength even at low temperatures, and good heat distortion resistance.

We have found that this object is achieved according to the invention by the thermoplastic molding compositions defined at the beginning. Preferred compositions of this type are given in the subclaims.

The thermoplastic molding compositions according to the invention surprisingly show improved impact strength compared with correspondingly modified molding compositions based on polyhexamethyleneadipamide, in particular at low temperatures. This is true even when the compositions contain fibrous or particulate fillers or mixtures thereof.

The partly aromatic copolyamides A) present in the thermoplastic molding compositions according to the invention contain as component $A_1$) 20–90% by weight of units derived from terephthalic acid and hexamethylenediamine. A small proportion of terephthalic acid, preferably not more than 10% by weight of the total aromatic dicarboxylic acids used, can be replaced by isophthalic acid or other aromatic dicarboxylic acids, preferably by those where the carboxyl groups are para-disposed.

Besides the units derived from terephthalic acid and hexamethylenediamine, copolyamides A) contain units derived from ε-caprolactam and/or units derived from adipic acid and hexamethylenediamine.

The proportion of units derived from ε-caprolactam is not more than 50% by weight, preferably 20–50% by weight, in particular 25–40% by weight, while the proportion of units derived from adipic acid and hexamethylenediamine is up to 80% by weight, preferably 30–75% by weight, in particular 35–65% by weight.

Copolyamides A) may also contain units not only of ε-caprolactam but also of adipic acid and hexamethylenediamine; in this case, it is an advantage for the proportion of units which are free of aromatic groups to be not less than 10% by weight, preferably not less than 20% by weight. The ratio of units derived from ε-caprolactam and units derived from adipic acid and hexamethylenediamine here is not subject to any particular restriction.

Particular advantageousness for many purposes has been found to be possessed by polyamides containing 50–80, in particular 60–75%, by weight of units derived from terephthalic acid and hexamethylenediamine (units $A_1$)) and 20-50, preferably 25-40%, by weight of units derived from ε-caprolactam (units $A_2$)).

Besides the above-described units $A_1$) to $A_3$), the partly aromatic copolyamides A) may additionally contain minor amounts, preferably not more than 15% by weight, in particular not more than 10% by weight, of further polyamide units of the type known from other polyamides. These units may be derivative from dicarboxylic acids of 4-16 carbon atoms and aliphatic or cycloaliphatic diamines of 4-16 carbon atoms and from aminocarboxylic acids and the corresponding lactams of 7-12 carbon atoms. Suitable monomers of these types are suberic acid, azeleic acid, sebacic acid and isophthalic acid, merely mentioned as representatives of dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane, merely mentioned as representatives of diamines, and capryllactam, enantholactam, omega-aminoundecanoic acid and laurolactam, merely mentioned as representatives of lactams or aminocarboxylic acids.

Particular advantageousness has been found to be possessed by partly aromatic copolyamides whose triamine content is less than 0.5, preferably less than 0.3%, by weight.

Most existing processes (cf. the references cited at the beginning) give partly aromatic copolyamides having triamine contents of above 0.5% by weight, which has an adverse effect on product quality and leads to problems in continuous production. A particular triamine responsible for these problems is dihexamethylenetriamine, which forms from the hexamethylenediamine starting material.

Copolyamides having a low triamine content have lower melt viscosities if compared at the same solution viscosity with products of the same composition but a higher triamine content. This fact has positive effects not only on the processibility but also on the product characteristics.

The melting points of partly aromatic copolyamides A) are within the range from 260° C. to above 300° C., this high melting point also being associated with a high glass transition temperature, generally of more than 75, in particular of more than 85° C. (in the dry state).

Binary copolyamides based on terephthalic acid, hexamethylenediamine and ε-caprolactam have, if they contain about 70% by weight of units derived from terephthalic acid and hexamethylenediamine, melting points within the range of 300° C. and (in the dry state) a glass transition temperature of more than 110° C.

Binary copolyamides based on terephthalic acid, adipic acid and hexamethylenediamine have melting points of 300° C. or more at even lower levels of about 55% by weight of units from terephthalic acid and hexamethylenediamine (HMD), although the glass transition temperature is not quite as high as in the case of binary copolyamides which contain ε-caprolactam in place of adipic acid or adipic acid/HMD.

The preferred partly aromatic copolyamides of low triamine content can be prepared by the processes described in EP-A-129,195 and -129,196.

According to these processes, an aqueous solution of the monomers, i.e. in this case of the monomers which form units $A_1$) to $A_3$), is heated under superatmospheric pressure at 250°-330° C. with simultaneous evaporation of water and formation of a prepolymer, the prepolymer and the steam are then continuously separated, the steam is rectified, and the entrained diamines are recycled. Finally, the prepolymer is passed into a polycondensation zone and is polycondensed under a superatmospheric pressure of 1-10 bar at 250°-330° C. The essential aspect of this process is that the aqueous salt solution is heated under a superatmospheric pressure of 1-10 bar for a residence time of less than 60 seconds, the conversion on emergence from the vaporizer zone being advantageously not less than 93% and the water content of the prepolymer being not more than 7% by weight.

These short residence times substantially prevent the formation of triamines.

The aqueous solution used generally has a monomer content of 30-70% by weight, in particular of 40-65% by weight.

The aqueous salt solution is advantageously passed continuously at 50°-100° C. into a vaporizer zone where the aqueous salt solution is heated at 250°-330° C. under a superatmospheric pressure of 1-10, preferably 2-6, bar. It is of course the case that the temperature used is above the melting point of the particular polyamide to be prepared.

As mentioned above, it is essential that the residence time in the vaporizer zone is not more than 60 seconds, preferably 10-55 seconds, in particular 10-40 seconds.

The conversion on exit from the vaporizer zone is not less than 93%, preferably 95-98%, and the water content is preferably within the range 2-5, in particular 1-3%, by weight.

The vaporizer zone is advantageously constructed as a tube bundle. Proven utility is possessed by tube bundles where the cross-section of the individual tubes is periodically tubelike and slotlike.

Furthermore, it has proved advantageous to pass the mixture of prepolymer and steam prior to the separation of the phases immediately after the vaporizer zone through a tubular mass transfer zone equipped with internal fitments. In this zone, the temperatures and pressure conditions employed in the vaporizer zone are maintained. The internal fitments, for example packings such as Raschig rings, metal rings or in particular wire netting, bring about a large surface area. This ensures intimate contact between the phases, i.e. prepolymer and steam. As a result, the amount of diamine evolved with the steam is appreciably reduced. In general, a residence time of from 1 to 15 minutes is maintained in the mass transfer zone. The mass transfer zone is advantageously constructed as a tube bundle.

The two-phase mixture of steam and prepolymer emerging from the vaporizer or mass transfer zone is separated. In general, separation takes place automatically, on account of the physical differences, in a vessel whose bottom part is advantageously constructed as a polymerization zone. The evolved vapors consist essentially of steam and diamines entrained in the course of the evaporation of water. These vapors are passed into a column and are rectified. Suitable columns are for example packed columns, bubble cap columns or sieve plate columns of from 5 to 15 theoretical plates. The column is advantageously operated under the same pressure conditions as the vaporizer zone. The diamines present in the vapors are separated off in the course of the rectification and are recycled into the vaporizer zone. It is also possible to pass the diamines into the subsequent polymerization zone. The rectified steam obtained is withdrawn at the top of the column.

The prepolymer obtained, which as indicated by its degree of conversion consists essentially of low molecular weight polyamide and any remaining amounts of unconverted salts and in general has a relative viscosity of 1.2–1.7, is passed into a polymerization zone. In the polymerization zone, the melt obtained is polycondensed at 250°–330° C., in particular 270°–310° C., under a superatmospheric pressure of 1–10 bar, in particular 2–6 bar. Advantageously, the vapors evolved in the course of the polymerization are rectified together with the abovementioned vapors in the column; preferably a residence time of 5–30 minutes is maintained in the polycondensation zone. The polyamide thus obtained, which generally has a relative viscosity of 1.2–2.3, is continuously withdrawn from the condensation zone.

In a preferred procedure, the polyamide thus obtained is passed in the form of a liquid melt through a discharge zone with simultaneous removal of the remaining water present in the melt. Suitable discharge zones are for example devolatilization extruders. The melt freed from the water is then extruded and granulated. The granules obtained are advantageously condensed in the solid phase by means of superheated steam at below the melting point, for example from 170°–240° C., until the desired viscosity is obtained. Advantageously, the steam used for this purpose is the steam obtained at the top of the column.

The relative viscosity, measured in 1% strength by weight solution in 96% strength by weight $H_2SO_4$ at 23° C., is after the solid phase postcondensation in general within the range 2.2–5.0, preferably 2.3–4.5.

In another preferred procedure, the polyamide melt emerging from the polycondensation zone is passed into a further polycondensation zone and is condensed there with continuous formation of new surfaces at 285°–310° C., advantageously under reduced pressure, for example 1–500 mbar, until the desired viscosity is obtained. Suitable apparatuses are known as finishers.

A further process, which is similar to the preceding one, is described in EP-A-129,196; see said specification for further details.

Component B) of the molding composition according to the invention comprises from 5 to 60, in particular from 7 to 50, particularly preferably from 10 to 35%, by weight of an impact modifying rubber.

Basically, it is possible to use any rubber which blended with polyamides brings about an improvement in the impact strength compared with pure polyamide.

In general, they are copolymers preferably formed from two or more of the following monomers as main components: ethylene, propylene, butadiene, isobutene, isoprene, chloroprene, vinyl acetate, styrene, acrylonitrile and acrylic and methacrylic esters having from 1 to 18 carbon atoms in the alcohol component.

Rubbers which contain reactive components which permit adhesion to the amine or carboxyl end groups of the polyamide are preferred here. Suitable reactive components are olefinically unsaturated carboxylic acids and anhydrides.

Rubbers B) are described for example in Houben-Weyl, Methoden der organischen Chemie, volume 14/1 (Georg-Thieme-Verlag, Stuttgart, 1961), pages 392 to 406, and in the monograph by C. B. Bucknall, "Toughened Plastics" (Applied Science Publishers, London, 1977).

In what follows, some preferred types of such elastomers will be described.

A first preferred group are the ethylenepropylene monomer (EPM) and ethylene-propylene-diene monomer (EPDM) rubbers, which preferably have an ethylene:propylene ratio within the range from 40:60 to 90:10.

The Mooney viscosities (MLI+4/100° C.) of such uncrosslinked EPM and EPDM rubbers (gel contents in general below 1% by weight) are preferably within the range from 25 to 100, in particular from 35 to 90 (measured using the large rotor following a 4 minutes' run at 100° C. in accordance with German Standard Specification DIN 53 523).

EPM rubbers generally have virtually no double bonds left, while EPDM rubbers have from 1 to 20 double bonds/100 carbon atoms.

Suitable diene monomers for EPDM rubbers are for example conjugated dienes such as isoprene and butadiene, nonconjugated dienes of from 5 to 25 carbon atoms such as penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo(5.2.1.0.2.6)-3,8-decadiene or mixtures thereof. Preference is given to 1,5-hexadiene, 5-ethylidenenorbornene and dicyclopentadiene. The diene content of EPDM rubbers is preferably from 0.5 to 50, in particular from 1 to 8%, by weight, based on the total weight of the rubber.

EPM and EPDM rubbers may preferably also have been grafted with reactive carboxylic acids or derivatives thereof. Purely by way of example there may be mentioned acrylic acid, methacrylic acid and derivatives thereof and maleic anhydride.

A further group of preferred rubbers are copolymers of ethylene with acrylic acid and/or methacrylic acid and/or the esters of these acids. In addition, the rubbers may contain dicarboxylic acids, for example maleic acid and fumaric acid, or derivatives of these acids, for example esters and anhydrides, and/or epoxy groups. These dicarboxylic acid derivatives and the epoxy groups are preferably incorporated into the rubber by addition to the monomer mixture of dicarboxyl- or of epoxy-containing monomers of the general formula I, II, III or IV

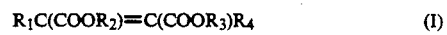

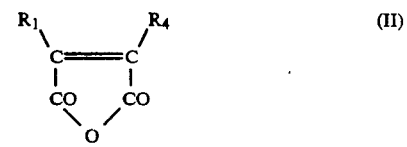

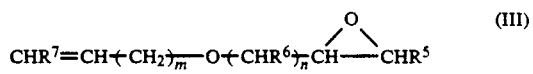

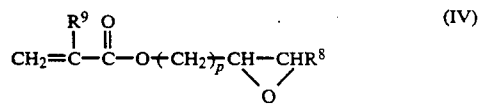

where $R^1$–$R^9$ are each hydrogen or alkyl of from 1 to 6 carbon atoms, m is an integer from 0 to 20, n is an integer from 0 to 10, and p is an integer from 0 to 5.

Preferably, $R^1$–$R^7$ are each hydrogen, m is 0 or 1, and n is 1. The corresponding compounds are maleic acid, fumaric acid, maleic anhydride, alkyl glycidyl ethers and vinyl glycidyl ethers.

Preferred compounds of the formulae I, II, III and IV are maleic acid, maleic anhydride and epoxy-containing esters of acrylic acid and/or methacrylic acid, of which glycidyl acrylate and glycidyl methacrylate are particularly preferred.

The ethylene content of the copolymers is in general within the range from 50 to 98% by weight, and the proportion of epoxy-containing monomers and the proportion of acrylic and/or methacrylic ester are each within the range from 1 to 49% by weight.

Particular preference is given to copolymers of from 50 to 98, in particular from 60 to 95%, by weight of ethylene, from 0.5 to 40, in particular from 3 to 20%, by weight of glycidyl acrylate and/or glycidyl methacrylate, acrylic acid and/or maleic anhydride, from 1 to 45, in particular from 10 to 35%, by weight of n-butyl acrylate and/or 2-ethylhexyl acrylate.

Further preferred esters of acrylic and/or methacrylic acid are the methyl, ethyl, propyl, i- and t-butyl esters.

In addition it is also possible to use vinyl esters and vinyl ethers as comonomers.

The above-described ethylene copolymers can be prepared in a conventional manner, for example by random copolymerization under high pressure and at elevated temperature. Suitable processes are described in the literature.

The melt flow index of the ethylene copolymers is in general within the range from 1 to 80 g/10 min (measured at 190° C. under a load of 2.16 kg).

Preferred elastomers (rubbers) B) also include graft copolymers with butadiene, butadiene/styrene, butadiene/acrylonitrile and acrylate grafting bases as described for example in DE-A-1,694,173 and DE-A-2,348,377.

Of these, a particular mention must be given to the ABS polymers as described in DE-A-2,035,390, DE-A-2,248,242 and EP-A-22,216, the last ones being particularly preferred.

The rubber B) can also comprise graft polymers of from 25 to 98% by weight of an acrylate rubber having a glass transition temperature of below −20° C. as a grafting base (base polymer) and from 2 to 75% by weight of a copolymerizable ethylenically unsaturated monomer as a graft addon (graft sheath).

The grafting base comprises acrylate and methacrylate rubbers which may contain up to 40% by weight of further comonomers. The $C_1$–$C_8$-esters of acrylic acid or methacrylic acid and the halogenated derivatives thereof but also aromatic acrylic esters and mixtures thereof are preferred. Suitable comonomers for the grafting base are acrylonitrile, methacrylonitrile, styrene, α-methylstyrene, acrylamides, methacrylamides and vinyl $C_1$–$C_6$-alkyl ethers.

The grafting base can be uncrosslinked or have been partially or completely crosslinked. Crosslinking is effected for example by copolymerization of preferably from 0.02 to 5% by weight, in particular from 0.05 to 2% by weight, of a crosslinking monomer having more than one double bond. Suitable crosslinking monomers are described for example in DE-A-2,726,256 and EP-A-50,265.

Preferred crosslinking monomers are triallyl cyanurate, triallyl isocyanurate, triacryloylhexahydro-s-triazine and trialkylbenzenes.

If the crosslinking monomers have more than 2 polymerizable double bonds, it is advantageous to restrict their amount to not more than 1% by weight, based on the grafting base.

Particularly preferred grafting bases are emulsion polymers having a gel content of more than 60% by weight (determined in dimethylformamide at 25° C. by the method of M. Hoffmann, H. Krömer, R. Kuhn, Polymeranalytik, Georg-Thieme-Verlag, Stuttgart, 1977).

Other suitable grafting bases are acrylate rubbers having a diene core as described for example in EP-A-50,262.

Suitable graft monomers are in particular styrene, α-methylstyrene, acrylonitrile, methacrylonitrile and methylmethacrylate or mixtures thereof, in particular those of styrene and acrylonitrile in a weight ratio of from 1:1 to 9:1.

The graft yield, i.e. the ratio of the amount of grafted monomer to the amount of graft monomer used, is in general within the range from 20 to 80%.

Rubbers based on acrylates which can be used according to the invention are described for example in DE-A-2,444,584 and DE-A-2,726,256.

Rubbers B preferably have a glass transition temperature of below −30° C., in particular of below −40° C.

It is of course the case that it is also possible to use mixtures of the abovementioned rubber types.

Component C) of the molding compositions according to the invention is up to 50, preferably 5–45, in particular 7–35%, by weight of fibrous or particulate fillers or mixtures thereof.

Examples of fibrous fillers are glass fibers, carbon fibers, aramid fibers, potassium titanate fibers and fibrous silicates such as wollastonite.

If glass fibers are used, they can have been finished with a size and an adhesion promoter for better compatibility with the polyamide.

In general, the glass fibers used have a diameter within the range 6–20 μm. They can be incorporated not only in the form of short fibers but also in the form of endless strands (rovings). In the ready-produced injection molding, the average glass fiber length is preferably within the range from 0.08 to 5 mm. Merely illustrative examples of particulate fillers are glass beads, particulate wollastonite, quartz powder, boron nitride, kaolin, calcium carbonate, magnesium carbonate (chalk) and titanium dioxide, of which wollastonite, titanium dioxide and kaolin are in general preferred.

As well as essential components A) and B) and optional component C), the molding compositions according to the invention may contain customary additives and processing aids. The proportion thereof is in general up to 20, preferably up to 10%, by weight, based on the total weight of components A) to C).

Customary additives are for example stabilizers and antioxidants, flameproofing agents, agents against thermal decomposition and decomposition by ultraviolet light, lubricants, mold release agents, colorants, dyes and pigments and plasticizers.

Antioxidants and heat stabilizers which may be added to the thermoplastic compositions according to the invention are for example halides of metals of group I of the Periodic Table, for example sodium halides, potassium halides or lithium halides, alone or combined with copper(I) halides, for example chlorides, bromides or iodides. It is also possible to use sterically hindered phenols, hydroquinones, substituted representatives of this group and mixtures thereof, preferably in concentrations of up to 1% by weight, based on the weight of the mixture.

Examples of UV stabilizers are various substituted resorcinols, salicylates, benzotriazoles and benzophenones, which are in general used in amounts of up to 2.0% by weight.

Lubricants and mold release agents which are in general added to the thermoplastic composition in amounts of up to 1% by weight are stearic acids, stearyl alcohol, alkyl stearates, N-alkylstearamides and esters of pentaerythritol with long-chain fatty acids.

The molding compositions according to the invention can be prepared in a conventional manner by mixing the starting components in conventional mixing apparatus, such as screw extruders, Brabender mills or Banbury mills, and then extruding. After extrusion, the extrudate is cooled and comminuted. The mixing temperatures are in general within the range from 260° to 350° C., preferably from 280° to 340° C.

The impact modified thermoplastic molding compositions according to the invention score over similar molding compositions based on aliphatic polyamides in particular by showing very good impact strength even at low temperatures. In addition, the better thermal stability of the partly aromatic copolyamides also brings advantages in this respect (which are of course partially compensated by the rubber of low thermal stability).

Owing to their balanced range of properties, the molding compositions according to the invention are suitable in particular for producing fibers, films and moldings, in particular housing parts.

EXAMPLE

The following components were used:

Component A

A/1: copolyamide composed of 30% by weight of units derived from ε-caprolactam and 70% by weight of units derived from terephthalic acid and hexamethylenediamine An aqueous solution consisting of 35 kg of ε-caprolactam, 55 kg of terephthalic acid, 38.5 kg of hexamethylenediamine and 128.5 kg of water was conveyed by means of a metering pump at a rate corresponding to a polyamide rate of 5 kg/hour from a hot stock reservoir vessel at about 80° C. into a partly horizontally, partly vertically disposed tubular vaporizer. The vaporizer was heated with a liquid heat transfer medium at 295° C. by rapid recirculation. The vaporizer had a length of 3 m and a capacity of 180 ml and heat transfer surface area of about 1300 cm². The residence time in the vaporizer was 50 seconds. The mixture of prepolymer and steam emerging from the vaporizer had a temperature of 290° C. and was separated in a separator into steam and melt. The melt was left in the separator for a further 10 minutes and was then extruded by means of a devolatilizing discharge screw, consolidated in a water bath and then granulated. The separator and the vaporizer zone were each kept under a pressure of 5 bar by means of constant pressure means situated downstream of the column. The steam separated off in the separator was passed into a packed column of about 10 theoretical plates which was charged at the top with about 1 l of condensed vapor per hour to produce a reflux. A temperature of 152° C. became established at the top of the column. The steam emerging downstream of the depressurizing valve was condensed and had a hexamethylenediamine content of less than 0.05% by weight and an ε-caprolactam content of less than 0.1% by weight. The bottom product was an aqueous solution of hexamethylenediamine containing 80% by weight of hexamethylenediamine and from 1 to 3% by weight of ε-caprolactam, both percentages being based on produced polyamide. This solution was pumped back into the starting salt solution before entry into the vaporizer.

Downstream of the vaporizer the prepolymer had a relative viscosity of 1.25, measured in 98% strength by weight sulfuric acid at 20° C., and, by end group analysis, was the product of the conversion of 93 to 95%. The bishexamethylenetriamine content was from 0.1 to 0.15% by weight, based on polyamide.

After leaving the separator in melt form the polyamide had a very light self-color, an extremely low bishexamethylenetriamine content of 0.17%, and a relative viscosity of from 1.65 to 1.80.

The product contained carboxyl and amino end groups in approximately equal proportions.

The level of extractables (extraction with methanol) was from 3.1 to 3.3% by weight.

In the discharge extruder, the melt was then depressurized down to atmospheric pressure and it virtually stopped from condensing any further in the course of a residence time of less than 1 minute. The granules obtained were condensed to a final viscosity of $\eta$-rel = 2.50 with superheated steam at 195° C. in the course of a continuous solid phase condensation lasting for a residence time of 30 hours. The level of extractables then was 0.2% by weight (methanol extract).

A/2: Partly aromatic copolyamide composed of 35% by weight of units from terephthalic acid and hexamethylenediamine and 65% by weight of units from adipic acid and hexamethylenediamine A salt solution consisting of 64.4 kg of a salt of adipic acid and hexamethylenediamine, 23.3 kg of terephthalic acid, 16.3 kg of hexamethylenediamine and 114 kg of water was introduced downward at about 80° C. into a vertically disposed vaporizer 2 m in length, 120 cm³ in capacity and about 860 cm² in heat transfer area. The vaporizer was heated with a vigorously recirculated liquid heat transfer medium at 295° C. The mixture of prepolymer and steam emerging from the vaporizer was at 288° C.

The conversion was 94%, and the residence time in the vaporizer was about 40 seconds.

The resulting mixture of prepolymer and steam was passed into a mass transfer zone equipped with packing and having a surface area of 2 m². The mass transfer zone had been constructed in such a way that no significant heat conversion took place and the melt of the prepolymer was brought into intimate contact with the steam. The residence time in the mass transfer zone was 0.5 minutes.

After passing through the mass transfer zone the mixture of prepolymer and steam was separated in a separator similarly to Example 1. The rest of the process was likewise as described in Example 1.

The polyamide thus obtained had a bishexamethylenetriamine content of 0.19 % by weight. The proportion of hexamethylenediamine left in the bottom product was only 1-2% by weight, based on polyamide.

The level of extractables (methanol extract) was 0.2–0.3% by weight.

The relative viscosity $\eta_{rel}$ (1 g/100 ml in 96% $H_2SO_4$ at 25° C.) after the solid phase postcondensation was 2.8.

A/CT: for comparison, a polyhexamethyleneadipamide having a relative viscosity of 2.7 (Ultramids® A3 from BASF AG).

Component B

B/1: polymer of ethylene/n-butylacrylate/acrylic acid/maleic anhydride (weight ratio 65/30/4.5/0.5) having a melt flow index (MFI) of 10.5 g/min (measured at 190° C. under a load of 2.16 kg)

B/2: ethylene-propylene rubber (weight ratio ethylene:propylene about 75:25) grafted with maleic anhydride, commercially obtainable from Exxon Chemicals under the name Exxelor® VA 1803.

Component C

C/1: wollastonite

Components A, B and any C if used were mixed, melted in a twin-screw extruder and extruded at a composition temperature of 320° C. The extrudate was cooled down, passed through a water bath and granulated. To determine the impact strength by Izod or by German Standard Specification DIN 53453 and the multiaxial damaging energy in line with German Standard Specification DIN 53443, granules were injection molded to produce appropriate test specimens.

The makeup of compositions and the results of the measurements are given in the following table:

TABLE (all amounts in % by weight)

| | Makeup | | | Izod impact strength kJ/m² | | | Notched impact strength kJ/m² | | | Damaging energy | |
| | A (% by | B (% by | C (% by | | | | | | | W₅₀ | (Nm) |
| Ex. | weight) | weight) | weight) | +23° C. | −20° C. | −40° C. | +23° C. | −20° C. | −40° C. | +23° C. | −20° C. |
|---|---|---|---|---|---|---|---|---|---|---|---|
| 1 | 80 A/1 | 20 B/1 | — | 88 | 22 | 15 | 120 | 122 | 94 | — | — |
| 2CT | 80 A/CT | 20 B/1 | — | 89 | 15 | 14 | 105 | 88 | 67 | — | — |
| 3 | 80 A/2 | 20 B/1 | — | 121 | 24 | 21 | 53 | 13 | 12 | — | — |
| 4CT | 80 A/CT | 20 B/1 | — | 83 | 21 | 12 | 39 | 10 | 9 | — | — |
| 5 | 80 A/2 | 20 B/2 | — | 117 | 98 | 30 | 50 | 35 | 12 | — | — |
| 6CT | 80 A/CT | 20 B/2 | — | 1039 | 30 | 20 | 50 | 17 | 12 | — | — |
| 7 | 75 A/2 | 5 B/1 | 20 C/1 | — | — | — | 9 | 5 | | 66 | 36 |
| 8CT | 75 A/CT | 5 B/1 | 20 C/1 | — | — | — | 8 | 3 | | 52 | 17 |

CT = comparative test

The experiments show that the molding compositions according to the invention have improved impact strengths (including multiaxial) at low temperatures compared with the existing molding compositions.

We claim:

1. A thermoplastic molding composition containing as essential components

A) 40-95% by weight of a partly aromatic copolyamide consisting essentially of
   A₁) 20-90% by weight of units derived from terephthalic acid and hexamethylenediamine,
   A₂) 0-50% by weight of units derived from ε-caprolactam and
   A₃) 0-80% by weight of units derived from adipic acid and hexamethylenediamine, B) 5-60% by weight of an impact modifying rubber, and in addition C) 0-50% by weight of fibrous or particulate fillers or mixtures thereof, and wherein the triamine content of the partly aromatic copolyamide A) is less than 0.5% by weight.

2. A thermoplastic molding composition as claimed in claim 1, wherein the partly aromatic copolyamide contains
   A₁) 50-80% by weight of units derived from terephthalic acid and hexamethylenediamine and
   A₂) 20-50% by weight of units derived from ε-caprolactam.

3. A thermoplastic molding composition as claimed in claim 2, wherein the partly aromatic copolyamide A) contains
   A₁) 60-75% by weight of units derived from terephthalic acid and hexamethylenediamine and
   A₂) 25-40% by weight of units derived from ε-caprolactam.

4. A thermoplastic molding composition as claimed in claim 1, wherein the level of impact modifying rubber B) is within the range 10-40% by weight, based on the total weight of the molding composition.

5. A thermoplastic molding composition as claimed in claim 1, containing 10-50% by weight of fibrous or particulate fillers C).

6. A molding obtainable from a partly aromatic copolyamide as defined in claim 1 as an essential component.

7. A thermoplastic molding composition as claimed in claim 1, wherein the triamine content of the partly aromatic copolyamide A) is less than 0.3% by weight.

8. A thermoplastic molding composition as claimed in claim 1, wherein the impact modifying rubber is an ethylenepropylene rubber.

9. A thermoplastic molding composition as claimed in claim 1 wherein the impact modifying rubber B) is a copolymer containing
   50 to 90% by weight of ethylene,
   0.5 to 40% by weight of glycidyl acrylate or glycidyl methacrylate or acrylic acid or maleic anhydride or mixtures thereof,
   1 to 45% by weight of n-butylacrylate or 2-ethylhexylacrylate or methylacrylate or ethylacrylate or propylacrylate or i-butylacrylate or t-butylacrylate or mixtures thereof.

10. A thermoplastic molding composition as claimed in claim 1 wherein component B) is an ethylene propylene rubber having an ethylene:propylene ratio within the range from 40:60 to 90:10.

11. A thermoplastic molding composition as claimed in claim 10, wherein the ethylene propylene rubber is grafted with reactive carboxylic acids or derivatives thereof.

12. A thermoplastic molding composition as claimed in claim 1 wherein component B) is an ethylene-propylene-diene rubber with a diene content of 0.5 to 50% by weight based on the total weight of rubber.

13. A thermoplastic molding composition as claimed in claim 12, wherein the ethylene-propylene-diene rubber is grafted with reactive carboxylic acids or derivatives thereof.

14. A thermoplastic molding composition containing as essential components
A) 40–95% by weight of a partly aromatic copolyamide consisting essentially of
   $A_1$) 20–90% by weight of units derived from terephthalic acid and hexamethylenediamine,
   $A_2$) 0–50% by weight of units derived from $\epsilon$-caprolactam and
   $A_3$) 0–80% by weight of units derived from adipic acid and hexamethylenediamine,
B) 5–60% by weight of an impact modifying rubber of a polymer of ethylene/n-butylacrylate/acrylic acid/maleic anhydride, and in addition
C) 0–50% by weight of fibrous or particulate fillers or mixtures thereof,
and wherein the triamine content of the partly aromatic copolyamide A) is less than 0.5% by weight.

* * * * *